(12) United States Patent
Yu et al.

(10) Patent No.: US 7,574,465 B2
(45) Date of Patent: Aug. 11, 2009

(54) DISPLAYING VARIABLES STORED IN CALCULATORS

(75) Inventors: Jinsong Yu, Sammamish, WA (US);
William Ben Kunz, Seattle, WA (US);
Robert Scott Dietz, Bellevue, WA (US);
Luke Kelly, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 868 days.

(21) Appl. No.: 11/171,150

(22) Filed: Jun. 29, 2005

(65) Prior Publication Data

US 2006/0235912 A1    Oct. 19, 2006

Related U.S. Application Data

(60) Provisional application No. 60/671,744, filed on Apr. 15, 2005.

(51) Int. Cl.
*G06F 3/02*   (2006.01)
(52) U.S. Cl. ...................................... 708/174
(58) Field of Classification Search ....................... None
See application file for complete search history.

(56) References Cited

U.S. PATENT DOCUMENTS

| | | | | |
|---|---|---|---|---|
| 5,210,708 A | * | 5/1993 | Negishi | 708/174 |
| 5,289,394 A | * | 2/1994 | Lapeyre | 708/142 |
| 5,532,946 A | * | 7/1996 | Phipps et al. | 708/174 |
| 5,535,317 A | * | 7/1996 | Tanaka et al. | 345/440 |
| 5,539,867 A | * | 7/1996 | Handa et al. | 345/440 |
| 6,081,819 A | * | 6/2000 | Ogino | 708/174 |
| 6,889,362 B2 | * | 5/2005 | Wattenberg et al. | 715/700 |
| 6,956,560 B2 | * | 10/2005 | Brothers et al. | 345/169 |

* cited by examiner

*Primary Examiner*—David H Malzahn
(74) *Attorney, Agent, or Firm*—Lee & Hayes, PLLC

(57) ABSTRACT

A centralized view and management of stored variables for calculators and pieces of software emulating calculators is provided. Users can glance at the status bar and know what variables are stored. A single click then brings up a window within which a list of the stored variables and their values is shown. In this window users can clear individual variables or the entire variable list. Users can be reminded that their calculations contain stored variables by displaying the stored variable names in one or more different colors so that errors can be easily detected and corrected.

11 Claims, 10 Drawing Sheets

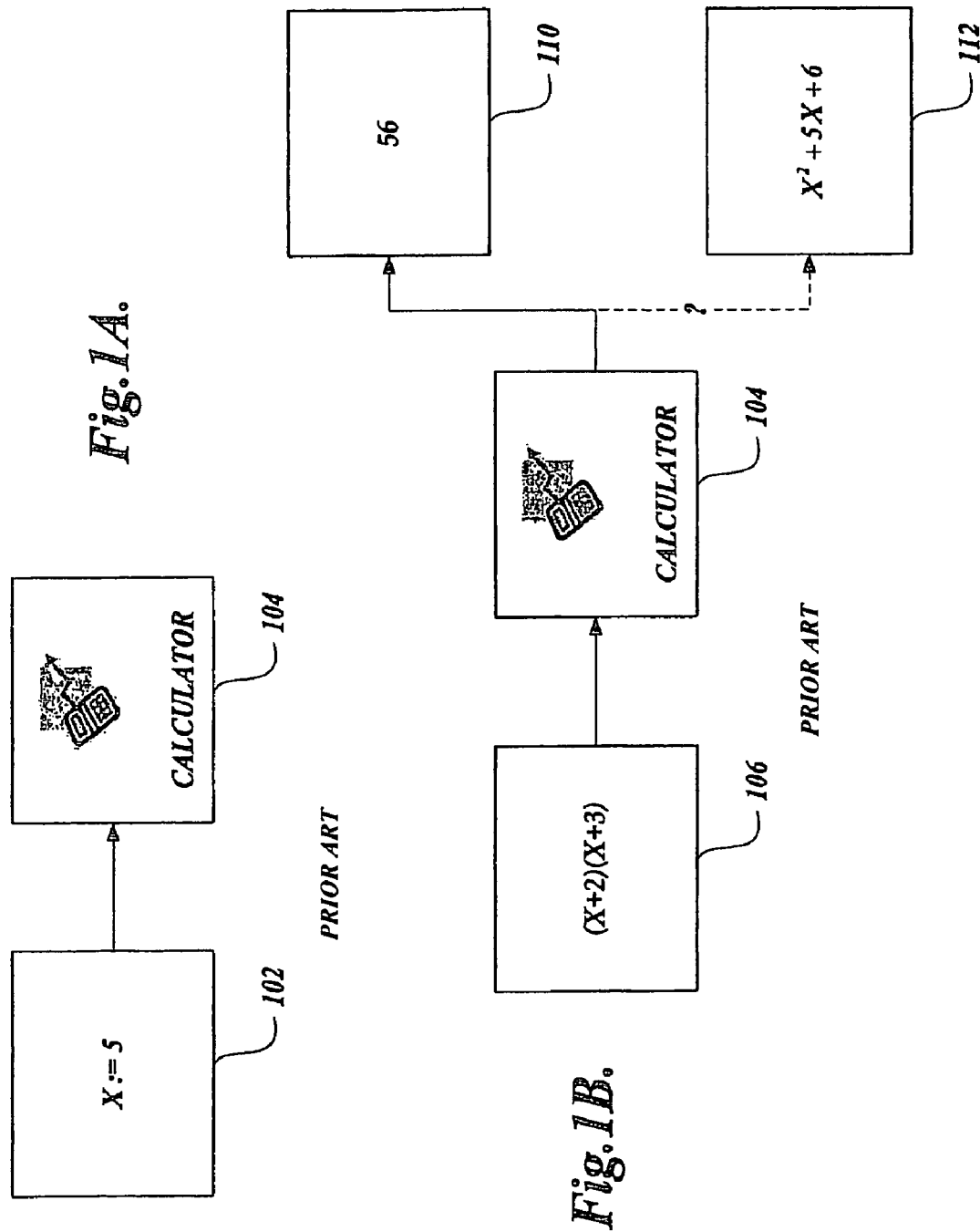

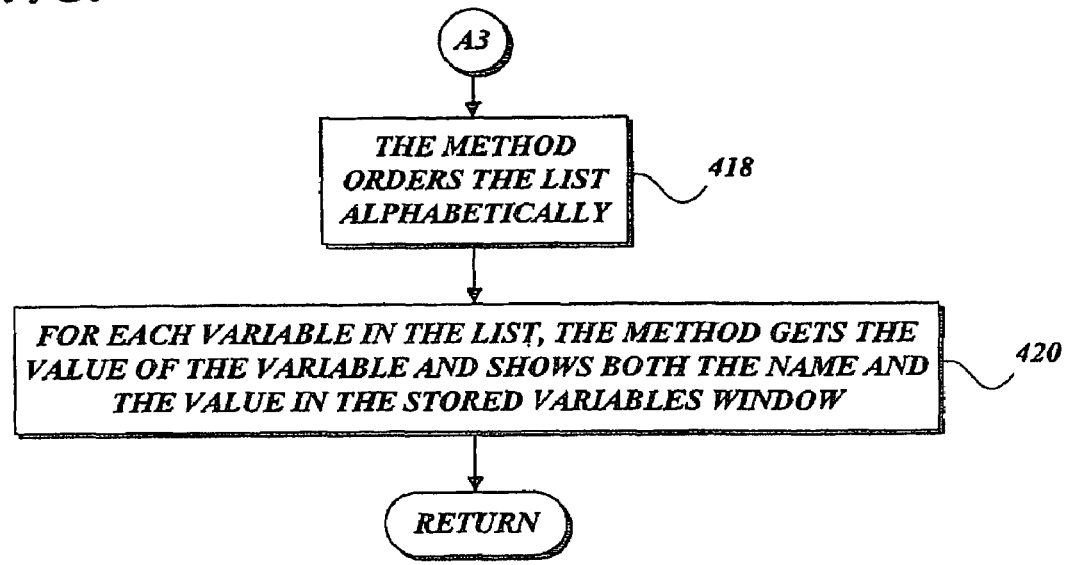

DISPLAYING VARIABLES STORED IN CALCULATORS

CROSS-REFERENCE TO RELATED APPLICATION

This application claims the benefit of U.S. Provisional Application No. 60/671,744, filed Apr. 15, 2005, which is incorporated herein by reference.

FIELD OF THE INVENTION

The present invention is generally related to software.

BACKGROUND

A variable is a named storage location capable of containing a mathematical value that can be modified by ongoing mathematical calculations. Storing values to variables and recalling stored variables in subsequent calculations is a common and an important functionality in any mathematical software executing on personal computers or handheld graphing calculators. It is convenient to use a name to increase the expressiveness of mathematical calculations. People tend to remember names better than numbers. For example, it is easier to remember that "z" is a named storage location for the value "789343415" then to try to remember the number itself. But as the number of variables increases, people may have a difficult time remembering whether a variable has been defined to store a value.

To illustrate this problem, consider a scenario in which a user is working with a piece of mathematical software to perform mathematical calculations. See FIGS. 1A-1B. The calculation requires the user to store several variables in a calculator 104, including a variable "x" defined to contain the value "5". See element 102. Later, the user needs to cause a symbolic resolution to the mathematical expression 106 "(x+2)(x+3)" and expects the answer 112 to be "$x^2+5x+6$". However, because there are many variables stored, the user may not remember "x" is now a stored variable 110 with the value "5". Without clearing variable x, the calculation will result in "56," and the user may not know the reason of the unexpected result, especially when the mathematical expression involved is more complicated.

This problem turns every session with the calculator into a software debugging venture for which many users neither have the expertise nor the patience. The problem is even more pernicious in certain handheld graphing calculators because the stored variables and their associated values persist between power-downs. In the education market, students are still at an early stage in their ability to grasp mathematical ideas. The problem described above at best causes wasted time and effort in requiring students to debug the problem but at worst it may cause students to incorrectly comprehend mathematical concepts, which cannot be easily undone.

SUMMARY

In accordance with this invention, a method, computer, and computer-readable medium is provided. The method form of the invention includes a method for displaying stored variables, which comprises receiving mathematical expressions as input to a computer-executable program that resolves mathematical expressions to their symbolic results and numeric results; and displaying stored variables and their associated values in one or more windows while the act of receiving mathematical expressions is occurring, the act of displaying automatically updating stored variables and their associated values when a new variable is added, a stored variable is removed, or an associated value is changed. The method further includes displaying a list of stored variables without displaying their associated values in a dedicated area on a status bar. The dedicated area is clickable, which when acted on displays the stored variables and their associated values. This dedicated area displays the stored variables without displaying their associated values and displays the list of stored variables with an ellipsis when the number of stored variables in the list is too many to display. The method additionally includes displaying stored variables and their associated values and displays the stored variables in a color or style distinguishable from the colors or styles used to display other variables.

In accordance with further aspects of this invention, a system form of the invention includes a computer for calculating mathematical expressions, which comprises a microprocessor on which a piece of software is executing for receiving a mathematical expression as input and for storing variables and their associated values; and a display on which a window is presented showing the variables and their associated values. The window contains user interface elements that are selectable to cause the variables to be disassociated from their values individually or collectively. The computer further includes the display that displays the variables with associated values in a color or style different from the colors or styles used to display other variables without associated values. The computer further includes a means for displaying a list of stored variables without displaying their associated values in a dedicated area of a computer. The list of stored variables is truncated when the list of stored variables is too long to display in the dedicated area.

In accordance with further aspects of this invention, a computer-readable form of the invention includes a computer-readable medium having computer-executable instructions stored thereon for implementing a method for displaying stored variables, which comprises receiving mathematical expressions as input to a computer-executable program that resolves mathematical expressions to their symbolic results and numeric results; and displaying stored variables and their associated values in one or more windows while the act of receiving mathematical expressions is occurring, the act of displaying comprising automatically updating stored variables and their associated values when a new variable is added, a stored variable is removed, or an associated value is changed. The method further includes displaying a list of stored variables without displaying their associated values in a dedicated area on a status bar. The dedicated area is clickable for causing the execution of the act of displaying stored variables and their associated values. The method also includes displaying stored variables without displaying their associated values and displays the list of stored variables with an ellipsis when the number of stored variables in the list is too many to display. The method additionally includes displaying stored variables and their associated values and displays the stored variables in a color or style distinguishable from the colors or styles used to display other variables.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 1A and 1B are block diagrams illustrating a conventional handheld calculator that provides an undesired numeric result;

FIGS. 4A-4G are process diagrams illustrating a method for displaying stored variables, in accordance with various embodiments of the present invention.

DETAILED DESCRIPTION

Pieces of conventional mathematical software such as those available on conventional handheld graphing calculators have not offered users the functionality to view or manage stored variables in a centralized location. The terms "centralized location or centralized view" mean the inclusion of one or more windows in which stored variables, free variables, and constants are displayed. In a typical working session, a user of a piece of mathematical software may store many values in many different variables. Various embodiments of the present invention provide a centralized view of stored variables and allow the management of these stored variables. Users need not remember what variables have been stored and mentally keep track of the values assigned to these stored variables. Mentally maintaining stored variable assignments is extra work which distracts users and may eventually lead to complex mathematical errors.

To address this issue and improve the users' experience, various embodiments of the present invention provide a centralized view and management of stored variables. Users can glance at the status bar and know what variables are stored. A single click then brings up a window within which a list of the stored variables and their values is shown. In this window users can clear individual variables or the entire variable list. The window can remain open while users perform inputs and calculations so that users always have a full view of the stored variables and their values. Users can be reminded that their calculations contain stored variables by displaying the stored variable names in a different color or style so that errors can be easily detected and corrected.

It is preferred that the status bar be visible to the users. The status bar preferably displays a list of stored variable names without their values. If the list is too long and there is not enough room to display the entire list, the list is truncated and an ellipsis ( . . . ) is inserted at the end to indicate the truncation. The arrow-like cursor is changed to a hand when the mouse pointer is over the variable list area of the status bar to indicate that the area is clickable. Clicking on the area brings up a stored variables window.

Figure 2A:
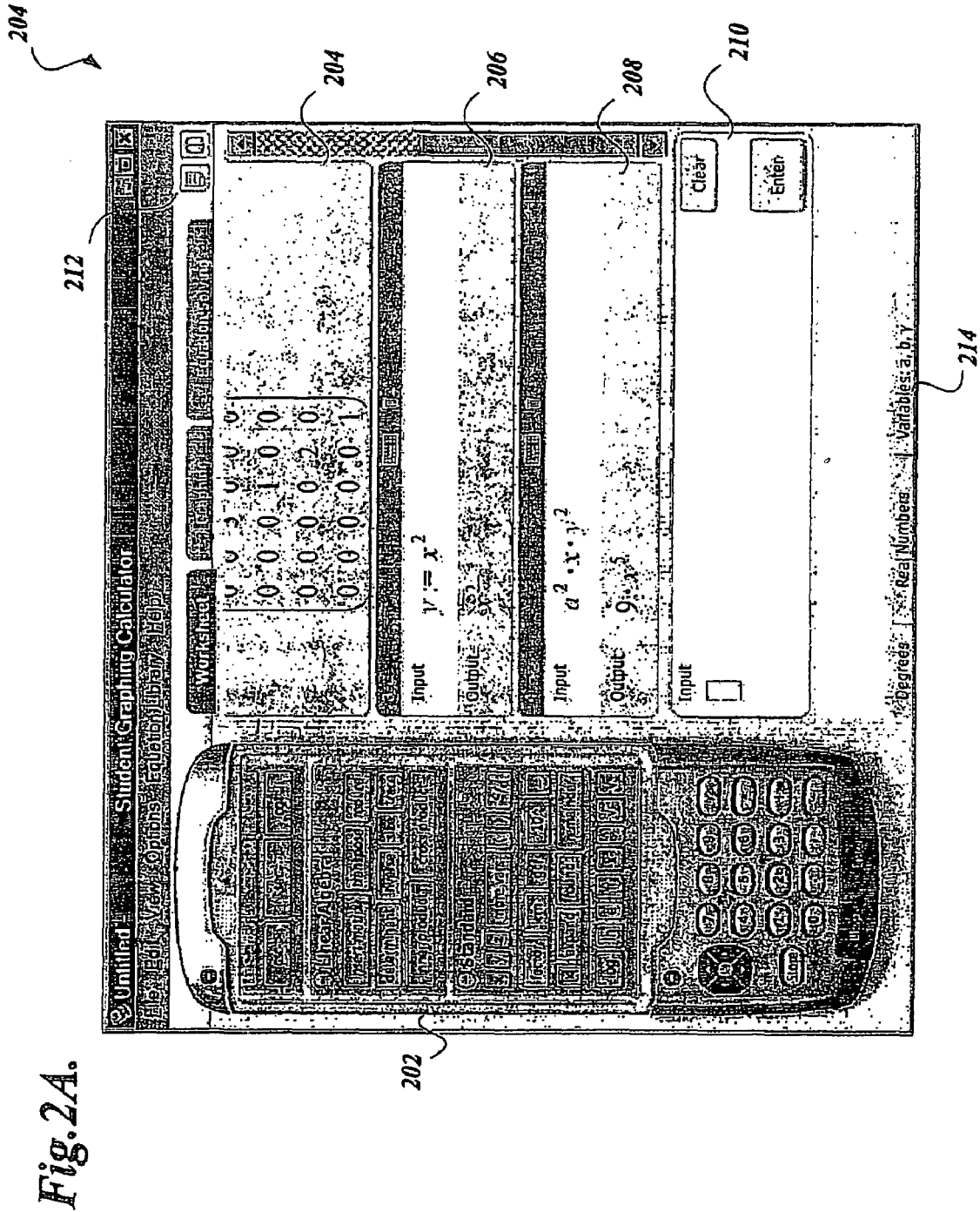
FIG. 2A is a pictorial diagram illustrating an exemplary user interface of a calculator and a status bar showing a list of stored variables.

FIG. 2A illustrates in greater detail a window 204 that includes a title bar, which is a horizontal space at the top of the window that contains the name of the window "Untitled—Student Graphing Calculator," a minimize button, a maximize button, and a close button, which is a square button that is usually located in the right corner of the title bar with an "X" marked on it. Below the title bar is a list of pull-down menus, such as a file menu, an edit menu, a view menu, an options menu, an equation library menu, and a help menu. Below the list of pull-down menus is a working area that includes a graphical representation of a calculator 202 with mathematical menus and a virtual numerical keyboard, which can be selected by a user. Adjacent to the calculator 202 are tabbed user interface elements, such as a worksheet tab, a graphing tab, and an equation solving tab. The worksheet tab is illustratively selected, which includes a pane 204 being partially shown with a portion of a matrix. Below the pane 204 is another pane 206 which includes an input area that shows that the variable y is assigned to the variable $x^2$ and is delimited by the symbol ":=". Pane 206 includes an output area which presents $x^2$. Pane 208 is located beneath pane 206 and presents an input area with the mathematical equation "$a^2 \cdot x \cdot y^2$". An output area located beneath the input area of pane 208 presents the symbolic result from the evaluation of the mathematical expression "$a^2 \cdot x \cdot y^2$" and the answer in symbolic form which is "$9 \cdot x^5$".

Preferably, variables that are stored variables distinguish themselves by a color or style different from other colors or styles used to denote other variables. For instance, because the variable y is assigned to the variable $x^2$, the variable y is preferably shown in a color different from the color used to present the variable $x^2$. Preferably, the variable a is shown in a color different from a color used to display the variable x because the variable a is a stored variable. Working retrogressively, the symbolic result shown in the output area of pane 208 is "$9 \cdot x^5$", in which it can be seen that the constant "9" is derived from the term "$a^2$," from which, algebraically, the variable a must have been assigned the numerical value "3". Given that the variable y has been assigned the mathematical expression $x^2$, it would be appreciated by one skilled in the art that the mathematical expression "$x \cdot y^2$" results in the term "$x^5$".

Beneath the pane 208 is an input pane 210 where a user inputs mathematical expressions from the calculator 202 and causes the mathematical expression to be evaluated, as shown in panes 206, 208. A clear button allows the user to remove the mathematical expression from the input pane 210. Below the clear button is an enter button, which can be selected by the user to confirm that the provided mathematical expression in the input pane 210 is to be evaluated. Adjacent to the tabbed user interface elements is a button 212, which when selected, brings a window 216 (discussed below) containing stored variables and their values.

Below the input pane 210 is a collection of dedicated areas, such as an area that indicates a unit of measure for angles, such as degrees. Another dedicated area indicates real numbers that are being worked on. Another dedicated area 214 shows a list of stored variables, such as "a, b, y." The dedicated area 214 allows the user to immediately apprehend variables that are stored variables to aid him in his understanding of mathematical expressions in the input pane so as to avoid errors. In other words, the user is able to determine whether a variable remains a free variable or whether the variable has been assigned a fixed value. If the list of stored variables is too long, then preferably the list is truncated and an ellipsis is inserted to help the user appreciate that additional stored variables are available, but are not shown. When a cursor, such as an arrow pointer, hovers above the dedicated area 214, the arrow pointer is transformed into another suitable cursor to indicate to the user that the dedicated area 214 is selectable so as to bring forth the window 216 where all or most of the stored variables are presented.

Figure 2B:
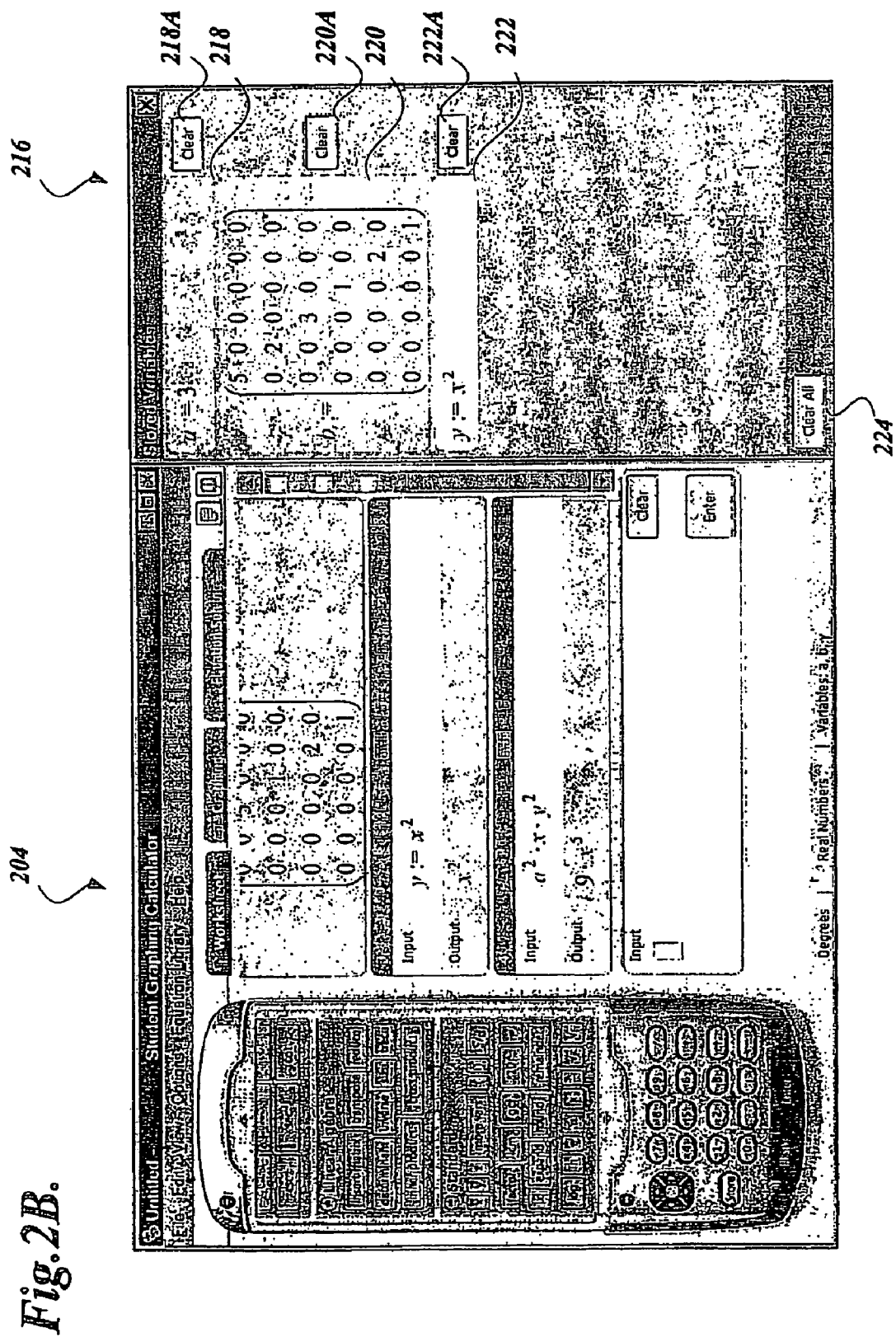
FIG. 2B is a pictorial diagram illustrating an exemplary user interface displaying stored variables and user interface elements to clear the stored variables individually or collectively.

The stored variables window is a window where users can view and manage all stored variables. Users can bring up this window by either clicking in the stored variable list area 202 in the status bar, or by clicking on the "stored variables" icon 204 at the top-right corner of the application. If the window is not big enough to display the stored variables and their values, horizontal and/or vertical scroll bars will appear. Next to each entry is a "Clear" button, which upon being clicked will clear the associated variable (disconnecting it from its originally stored value) and remove this variable from the status bar. The "Clear All" button at the bottom of the screen clears all stored variables and removes the variables from the status bar. To prevent users from unintentionally clearing all variables, a warning dialog box can be displayed before the variables are cleared and users can cancel the action. The cursor will change to a hand when the mouse is over a variable entry to indicate that it is clickable. Clicking on a variable entry will insert the variable name (not the value) to the current input box. FIG. 2B shows the stored variables window in greater detail.

FIG. 2B illustrates windows 204, 216. Various elements connected with the window 204 have been described above and for brevity purposes they will not be repeated here. The window 216 appears adjacent to the window 204. The window 216 includes a title bar appearing as a horizontal space located at the top of the window containing the name of the window "Stored Variables," and a close button, which is a square button that is usually located in the right corner of the title bar with an "X" mark on it. Appearing below the title bar is a working area that shows stored variables. Pane 218 indicates that the variable a is a stored variable and is assigned to the value "3". A clear button 218A allows the user to eliminate the assignment of the variable a to the value "3". Pane 220 indicates that the variable b is assigned to a matrix of values. A clear button 220A allows the assignment of the matrix to the variable b to be eliminated. Below pane 220 is a pane 222 indicating that the variable y is assigned to the term "$x^2$". A button 222A allows the user to eliminate the assignment of the term $x^2$ to the variable y. Beneath the window 216 is a "Clear All" button 224, which when selected by the user, eliminates all stored variables.

The stored variables window is modeless. It can remain open while users perform inputs and calculations. If more variables are assigned, or some variables are cleared, while the window is open its content will be automatically refreshed to display the most current list. This gives users full view into the stored variables and their values while they perform work and can be especially useful when many stored variables are involved in the calculation.

When a stored variable is used in a calculation, its name can be displayed in a different color so that users can easily distinguish stored variables from free variables and correct errors caused by misusing stored variables. When a variable is stored in worksheet, a brief animation effect can be shown to zoom a box from the input box into the stored variables icon at the top-right corner of the application. This animation is designed to help new users discover the stored variables window easily.

Figure 3B:
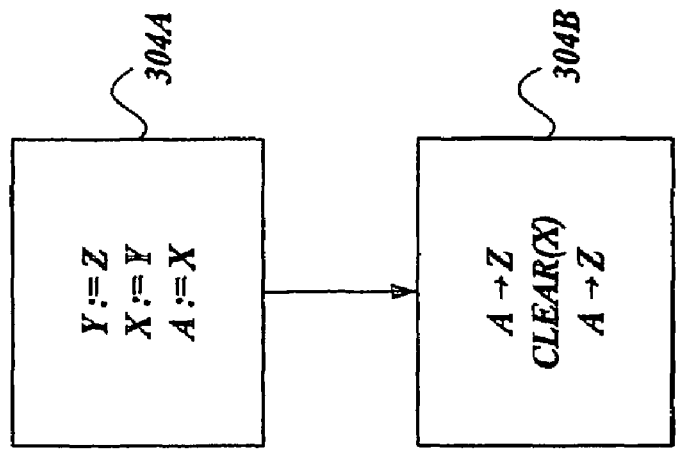
FIG. 3B is a block diagram illustrating another preferred precedent behavior in the assignment of values to variables.
Figure 3A:
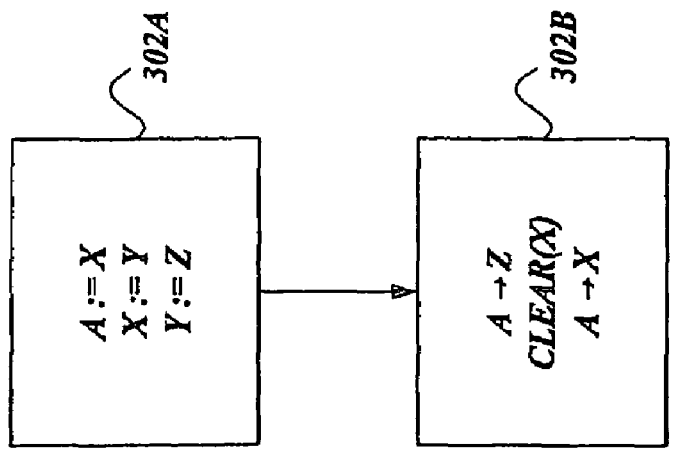
FIG. 3A is a block diagram illustrating a preferred precedent behavior in the assignment of values to variables.

FIG. 3A illustrates block 302A in which the variable a is assigned to the variable x; the variable x is assigned to the variable y; and the variable y is assigned to the variable z. Block 302B indicates symbolic evaluation of various variables. The variable a is symbolically resolved to the variable z due to the symbolic assignments expressed in the first line of block 302A. In the next line, a clear (x) command is issued, causing the variable x to be eliminated as a stored variable. In other words, the variable x is no longer assigned to the variable y and is now a free variable. When the variable a is evaluated, the variable a is symbolically resolved to the variable x in the third line. In other words, when the assignment of the variable x is terminated, the variable a reverts back to its original assignment whose value is the variable x.

FIG. 3B illustrates another example of precedent behavior in accordance with various embodiments of the present invention. Block 304A illustrates various assignments, such as the assignment of the variable y to the variable z in the first line of block 304A; the assignment of the variable x to the variable y in the second line of block 304A; and the assignment of the variable a to the variable x in the third line of block 304A. When the variable a is evaluated, it symbolically reverts to the variable z in the first line of block 304B. A clear (x) command is issued at the second line of block 304B, causing the assignment of the variable x to the variable y to terminate. Next at the third line of block 304B, when the variable a is again evaluated, it symbolically reverts to the variable z, notwithstanding the fact that the variable x assignment has been terminated.

FIGS. 4A-4G illustrate a process 400 for displaying stored variable lists in a status bar. From a start block, the process 400 proceeds to block 402 where the method gets a list of all stored variable names. Next, at block 404, the method orders the list alphabetically. A test is performed at decision block 406 to determine whether there is enough room in the status bar to display the list of stored variable names. If the answer to the test at decision block 406 is no, the method 400 truncates the list to fit the dedicated area in the status bar (and optionally provides an ellipses to indicate additional stored variables not shown in the status bar) at block 408. The method then proceeds to another continuation terminal ("Terminal A1"). If the answer to the test at decision block 406 is yes, the method also continues to Terminal A1 and proceeds to block 410 where the method displays the list in the dedicated area in the status bar.

Figure 4A:
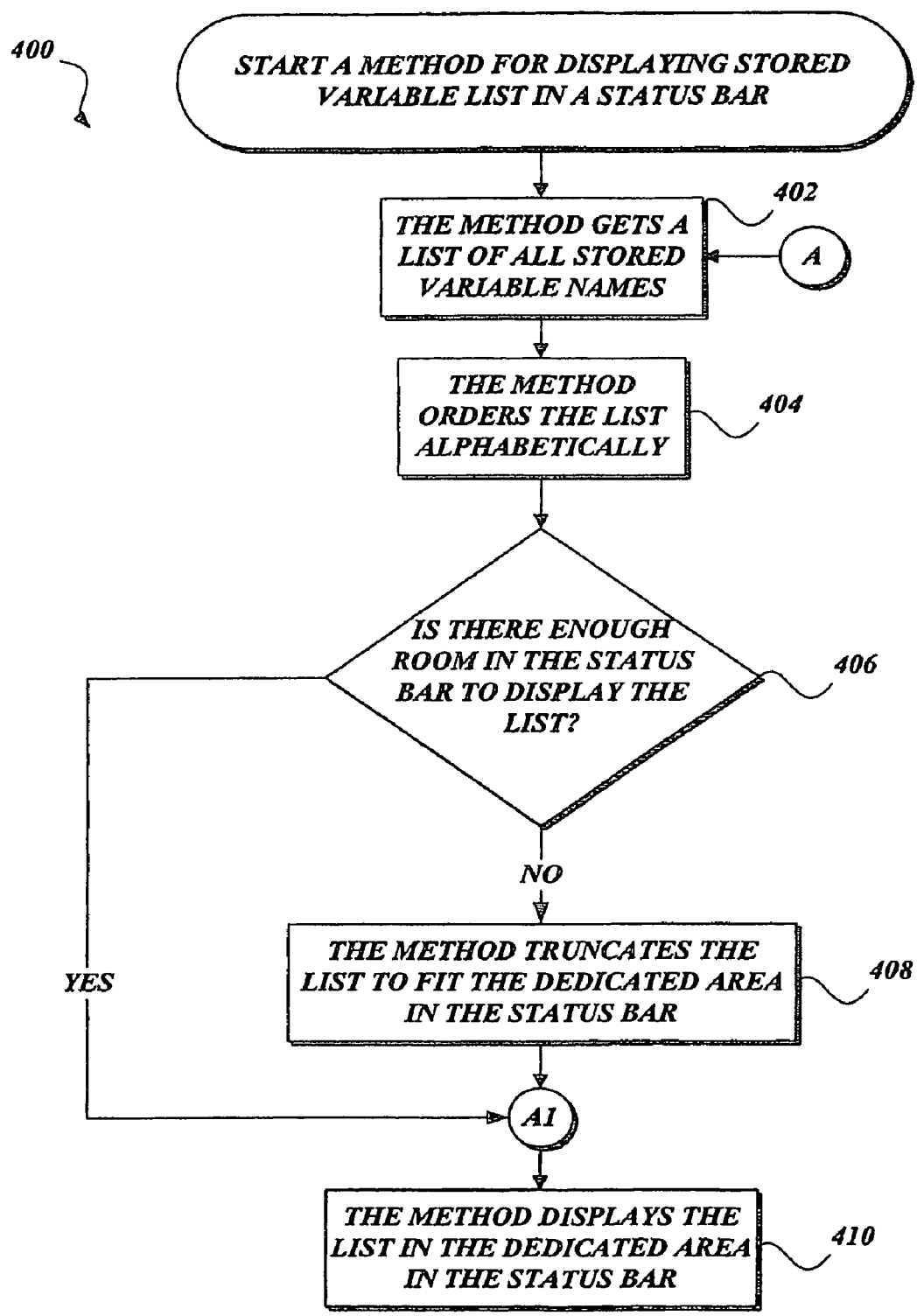
Figure 4B:
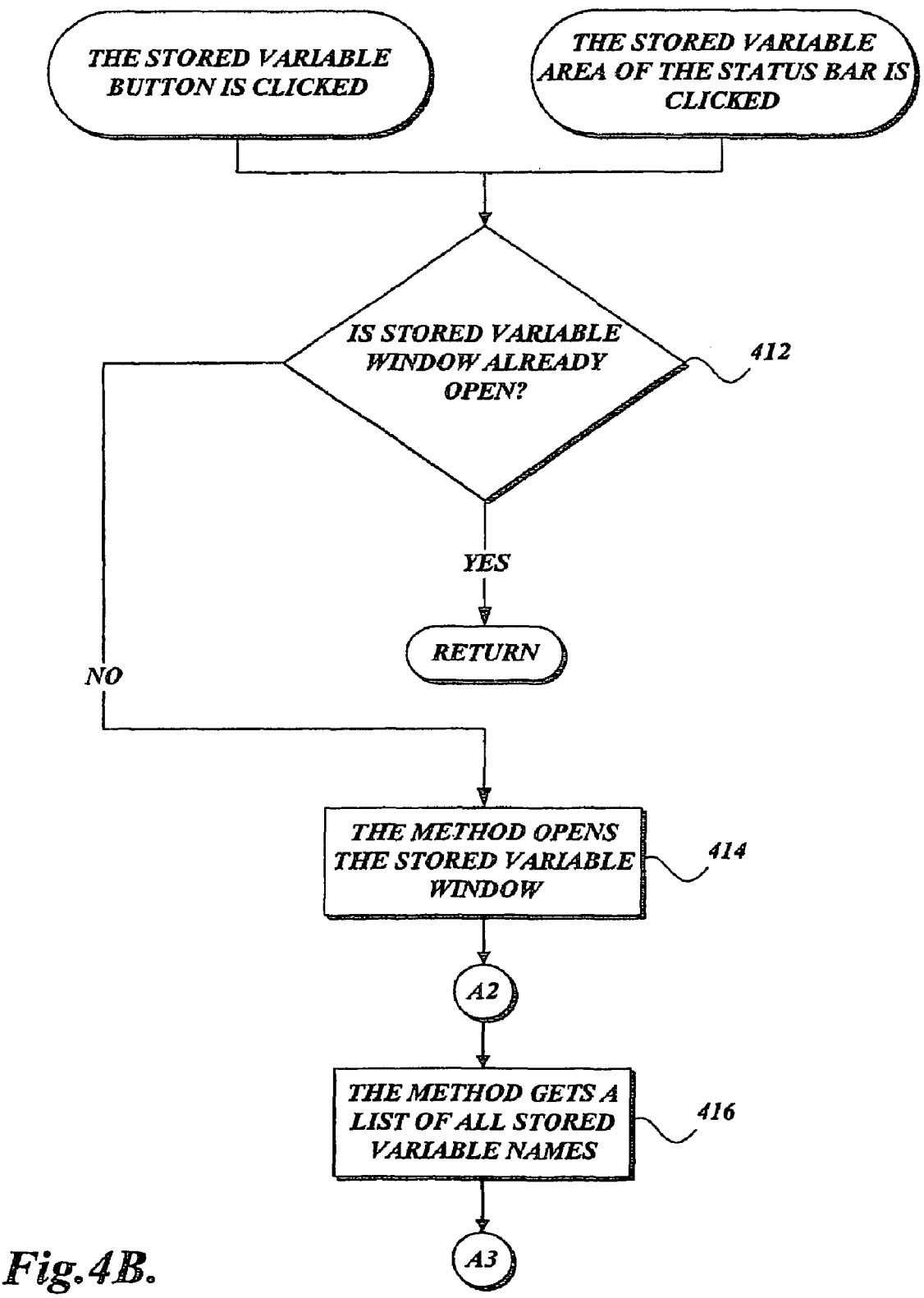
Figure 4E:
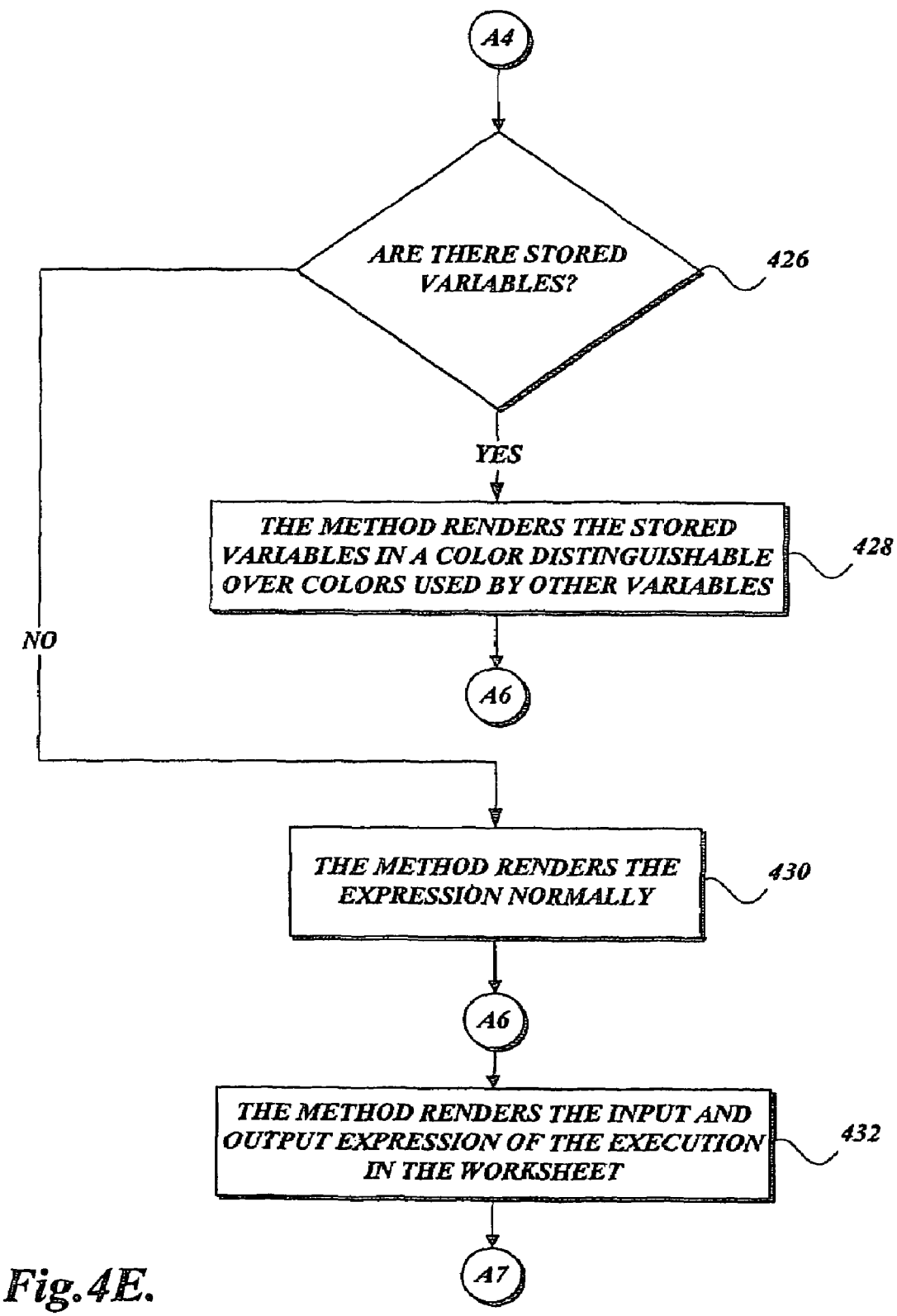
Figure 4F:
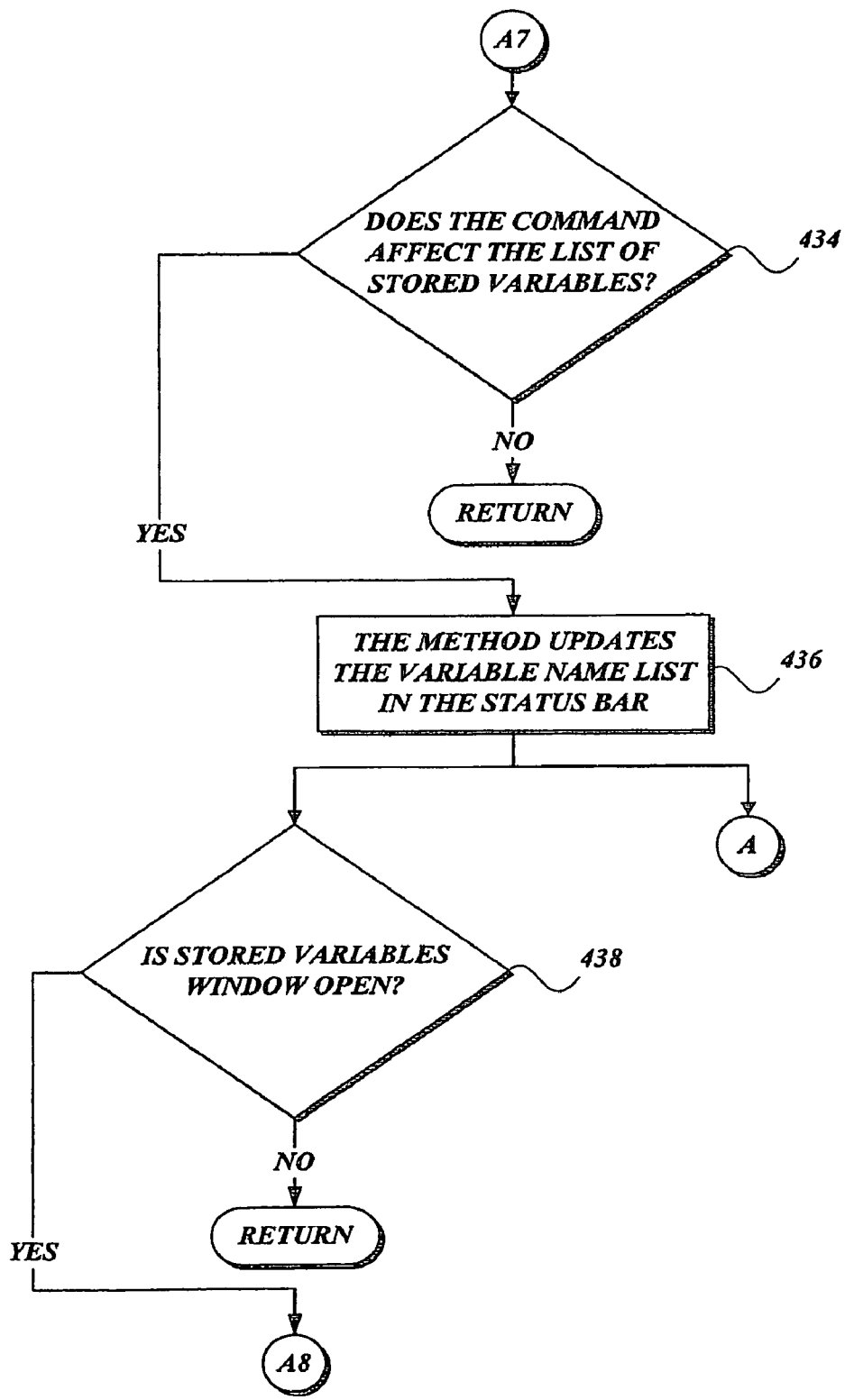
Figure 4G:
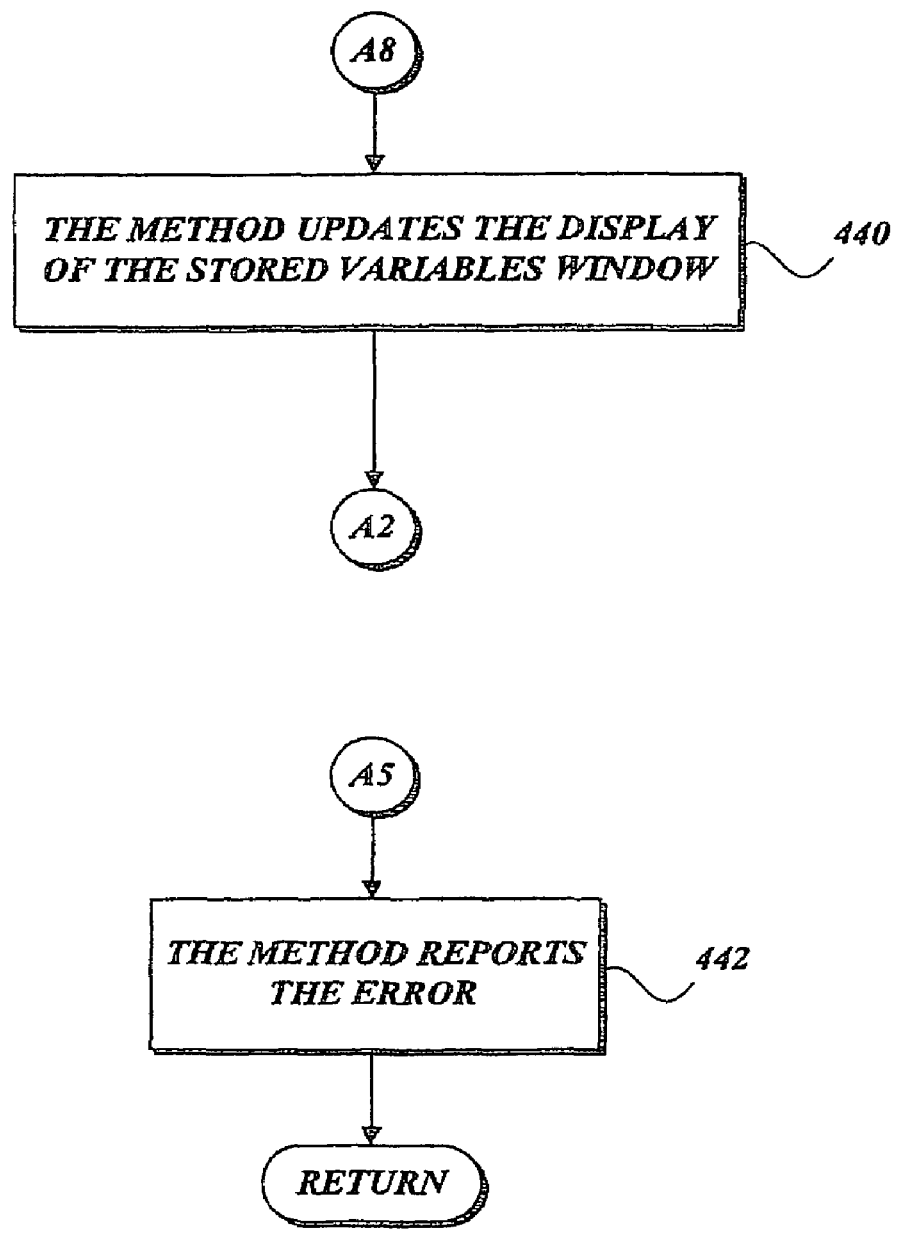

At FIG. 4B, when either one of two events occurs, such as the stored variable button being clicked or the stored variable area of the status bar being clicked, a test is performed at decision block 412 to determine whether the stored variable window is already open. If the answer to the test at decision block 412 is yes, the method 400 returns from execution. Otherwise, the answer to the test at decision block 412 is no, and the method proceeds to block 414 where the method opens the stored variable window. The method 400 proceeds to another continuation terminal ("Terminal A2") and progresses to block 416 where the method gets a list of all stored variable names. The method 400 then continues at another continuation terminal ("Terminal A3").

From Terminal A3 (FIG. 4C), the method proceeds to block 418 where the method 400 orders the list alphabetically. Next, at block 420, for each variable in the list, the method gets the value of the variable and shows both the name and the value in the stored variables window. The method 400 then returns from execution.

FIG. 4D illustrates another event for which the process will be awakened to respond to the event. A command to perform a calculation is received by the process. At block 422, the method executes the command in the algebra engine. A test is performed at decision block 424 to determine whether there is an error in the execution. If the answer to the test at decision block 424 is no, the method proceeds to another continuation terminal ("Terminal A4"). If the answer is yes to the test at decision block 424, the method proceeds to as yet another continuation terminal ("Terminal A5").

From Terminal A4 (FIG. 4E), the method proceeds to decision block 426 where a test is performed to determine whether there are stored variables. If the answer to the test at decision block 426 is yes, the method renders the stored variables in a color distinguishable from colors used by other variables. See block 428. The method then continues at another continuation terminal ("Terminal A6"). If the answer to the test at decision block 426 is no, the method renders the expression normally. See block 430. In other words, the method presents the mathematical expression without using a color distinguishable from colors used by other variables. The method then continues to Terminal A6 and proceeds to block 432 where the method renders the input and output expression of the execution in the worksheet. The method 400 then continues to another continuation terminal ("Terminal A7").

From Terminal A7 (FIG. 4F), the method proceeds to another decision block 434 where a test is performed to determine whether the command affects the list of stored variables. If the answer to the test at decision block 434 is no, the method returns from execution. If the answer to the test at decision block 434 is yes, the method updates the variable name list in the status bar. Two paths of execution then occur. In one path, the method continues to Terminal A where it loops back to block 402 and the above-identified processing steps are repeated. The other path of execution takes the method to decision block 438 where a test is performed to determine whether the stored variables window is open. If the answer to the test at decision block 438 is no, the method returns from execution. Otherwise, the answer to the test at decision block 438 is yes, and the method continues to another continuation terminal ("Terminal A8").

From Terminal A8 (FIG. 4G), the method proceeds to block 440 where it updates the display of the stored variables window by continuing to Terminal A2 where it loops back to block 416, and the above-identified processing steps are repeated. From Terminal A5 (FIG. 4G), the method reports an error at block 442 and returns from execution.

While the preferred embodiment of the invention has been illustrated and described, it will be appreciated that various changes can be made therein without departing from the spirit and scope of the invention.

The embodiments of the invention in which an exclusive property or privilege is: claimed are defined as follows:

1. A method for displaying stored variables, comprising:
    employing a processor executing computer-executable instructions stored on a computer-readable storage medium to implement the following acts:
        receiving mathematical expressions as input to a computer-executable program that resolves mathematical expressions to their symbolic results and numeric results;
        displaying stored variables and their associated values in one or more windows while the act of receiving mathematical expressions is occurring, the act of displaying automatically updating stored variables and their associated values when a new variable is added, a stored variable is removed, or an associated value is changed; and
        disassociating the stored variables from their values individually or collectively upon user selection of an interface element contained in the one or more windows.

2. The method of claim 1, further including displaying a list of stored variables without displaying their associated values in a dedicated area on a status bar, the dedicated area being clickable for causing the execution of the act of displaying stored variables and their associated values.

3. The method of claim 2, wherein the act of displaying stored variables without displaying their associated values displays a truncated list of stored variables with an ellipsis when the number of stored variables in the list is too many to display.

4. The method of claim 1, wherein the act of displaying stored variables and their associated values displays the stored variables in a color or style distinguishable from the colors or styles used to display other variables.

5. A computer for calculating mathematical expressions, comprising:
    a microprocessor on which a piece of software is executing for receiving a mathematical expression as input and for storing variables and their associated values; and
    a display on which a window is presented showing the variables and their associated values, the window containing user interface elements that are selectable to cause the variables to be disassociated with their values individually or collectively.

6. The computer of claim 5, wherein the display displays the variables with associated values in a color different from the colors used to display other variables without associated values.

7. The computer of claim 5, further including means for displaying a list of stored variables without displaying their associated values in a dedicated area of a computer, the list of stored variables being truncated when the list of stored variables is too long to display in the dedicated area.

8. A computer-readable storage medium having computer-executable instructions stored thereon for implementing a method for displaying stored variables, comprising:
    receiving mathematical expressions as input to a computer-executable program that resolves mathematical expressions to their symbolic results and numeric results;
    displaying stored variables and their associated values in one or more windows while the act of receiving mathematical expressions is occurring, the act of displaying automatically updating stored variables and their associated values when a new variable is added, a stored variable is removed, or an associated value is changed; and
    disassociating the stored variables from their values individually or collectively upon user selection of an interface element contained in the one or more windows.

9. The method of claim 8, further including displaying a list of stored variables without displaying their associated values in a dedicated area on a status bar, the dedicated area being clickable for causing the execution of the act of displaying stored variables and their associated values.

10. The method of claim 9, wherein the act of displaying stored variables without displaying their associated values displays the list of stored variables with an ellipsis when the number of stored variables in the list is too many to display.

11. The method of claim 8, wherein the act of displaying stored variables and their associated values displays the stored variables in a color distinguishable from the colors used to display other variables.

* * * * *